United States Patent
Pyzik et al.

(10) Patent No.: US 6,649,671 B2
(45) Date of Patent: Nov. 18, 2003

(54) CONCRETE AND PROCESS TO MAKE SAME

(75) Inventors: Aleksander J. Pyzik, Midland, MI (US); Ted A. Morgan, Midland, MI (US); Kenneth B. Stewart, Jr., Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 438 days.

(21) Appl. No.: 09/804,112

(22) Filed: Mar. 12, 2001

(65) Prior Publication Data

US 2001/0047045 A1 Nov. 29, 2001

Related U.S. Application Data

(60) Provisional application No. 60/188,713, filed on Mar. 13, 2000.

(51) Int. Cl.$^7$ ................................................ C08L 83/00
(52) U.S. Cl. ................................ 523/201; 524/4; 524/7; 524/8
(58) Field of Search .............................. 523/201; 524/4, 524/7, 8

(56) References Cited

U.S. PATENT DOCUMENTS

| | | | | |
|---|---|---|---|---|
| 4,584,347 A | 4/1986 | Harpell et al. | ............... | 525/119 |
| 5,399,195 A | 3/1995 | Hansen et al. | ............... | 106/711 |
| 5,628,822 A | 5/1997 | Hogan | ..................... | 106/802 |
| 5,753,368 A | 5/1998 | Berke et al. | ................ | 428/375 |
| 6,171,386 B1 * | 1/2001 | Sabins | ......................... | 106/724 |

FOREIGN PATENT DOCUMENTS

| | | |
|---|---|---|
| JP | 02199046 A | 8/1990 |
| JP | 07229022 A | 8/1995 |
| JP | 07330398 | 12/1995 |
| WO | WO 99/46327 | 9/1999 |

* cited by examiner

*Primary Examiner*—Peter D. Mulcahy

(57) ABSTRACT

A concrete article is prepared by mixing concrete, water and a reinforcing polymer comprised of a substantially random interpolymer of at least one α-olefin, with at least one vinyl or vinylidene aromatic monomer and curing said concrete mixture to form a concrete article having the reinforcing polymer therein, such that the reinforcing polymer has a surface comprised of the substantially random interpolymer in contact with the concrete.

25 Claims, No Drawings

CONCRETE AND PROCESS TO MAKE SAME

CROSS-REFERENCE TO RELATED APPLICATION

This application claims the benefit of U.S. Provisional Application Ser. No. 60/188,713, filed Mar. 13, 2000.

FIELD OF THE INVENTION

The invention relates to improved concrete and methods of forming the improved concrete. In particular, the invention relates to concrete containing plastic fibers.

BACKGROUND OF THE INVENTION

Generally, concrete is a brittle material with high compressive strength but low tensile strength. In the concrete industry, all concrete work is typically specified on the basis of the compressive strength. Any attempt to improve the crack strength (tensile strength) and toughness of the concrete almost always requires the introduction of reinforcing addition. For example, rebar (steel rods) is added which provides structural integrity but does not eliminate cracking. Metal mesh has also been added to reduce cracking but it cannot be used effectively, for example, to reinforce concrete of complex geometry.

Plastic fibers have also been used to improve the tensile strength and toughness (resistance to cracking). For example, polypropylene (PP), polyethylene (PE), polyethylene terephthalate (PET), aramids (e.g., KEVLAR, a trademark of E.I. du Pont de Nemours & Co.) and polyvinyl alcohol fibers have been used. However, all of these fibers suffer from one or more problems, such as high cost, low alkaline resistance, low tenacity or low interfacial bonding between the concrete and the fiber. Polypropylene and polyethylene have been the most preferred fiber to date due to their high tenacity and low cost. Unfortunately, these fibers suffer from very low interfacial bonding.

To remedy this problem, coatings have been formed on the surface of the fibers by applying a liquid, such as glycerol ether or glycol ether on the fiber surface, as described by WO 980766. Coatings have also been applied by vapor deposition, such as described in JP 60054950. Similarly, chemically modifying the surface has been done, such as described by JP 10236855 (treatment of the surface with a polyoxyalkylenephenyl ether phosphate and polyoxyalkyl fatty acid ester). Unfortunately, these methods naturally lead to increased cost, complexity and potentially insufficient bonding of the coating to the fiber.

Another remedy has been the incorporation of inorganic particles in and on the fiber, such as described by JP 07002554. Unfortunately, the fiber process becomes much more difficult (e.g., fiber breakage) and increases the cost and generally decreases the tenacity of the fiber.

Accordingly, it would be desirable to provide a concrete formulation that, for example, improves one or more of the problems of the prior art, such as improving the toughness without substantially increasing the cost of the concrete.

SUMMARY OF THE INVENTION

We have now discovered a new type of concrete containing a polyolefin reinforcing polymer that has improved bonding to the concrete in the absence of any treatment of the surface of the reinforcing polymer. This in turn has resulted in concrete with improved properties, lower cost, or both, compared to other reinforced concrete.

A first aspect of the invention is a concrete article comprised of concrete having therein a reinforcing polymer that has a surface in contact with the concrete, said surface being comprised of a substantially random interpolymer of at least one α-olefin with at least one vinyl or vinylidene aromatic monomer.

A second aspect of the invention is a method of preparing concrete comprised of mixing concrete, water and a reinforcing polymer comprised of a substantially random interpolymer of at least one α-olefin, with at least one vinyl or vinylidene aromatic monomer, and curing said concrete mixture to form the concrete article having the reinforcing polymer therein, such that the reinforcing polymer has a surface comprised of the substantially random interpolymer in contact with the concrete.

A third aspect of the invention is a concrete article formed by the process of the second aspect.

The concrete of this invention may be used in any application suitable for concrete, but it is especially well-suited for parking garages, bridge decks, white toppings, tunnels, mining, slope stabilization, architectural purposes, such as landscaping stones, skate boarding rinks, modern architecture, art sculptures, fast setting/non-slumping ceilings, swimming pools, and for repairing and retrofitting existing structures.

DETAILED DESCRIPTION OF THE INVENTION

The concrete used to form the concrete article of this invention may be any suitable concrete, such as those known in the art. Generally, the concrete is a mixture comprised of Portland cement. Portland cement is used as is commonly understood in the art and defined by *Hawley's Condensed Chemical Dictionary*, $12^{th}$ Ed., R. Lewis, Van Nostrand Co., NY, p 239, 1993.

It is understood that the reinforcing polymer in the concrete is a solid at ambient conditions. That is to say, the polymer is added as a solid object and is a solid after the concrete is cured. The polymer may be any shape useful in making the concrete article. Preferably the polymer is a fiber, bundles of fibers, sheets, tapes, laminates or combinations thereof. Preferably the reinforcing polymer is a fiber as described herein. Desirably, the reinforcing polymer is uniformly distributed within the concrete.

The amount of reinforcing polymer in the concrete generally ranges from about 0.05 volume percent to about 10 volume percent of the concrete article. Preferably the amount of the reinforcing polymer is at least about 0.1 percent, more preferably at least about 0.3 percent and most preferably at least about 0.5 percent, to preferably at most about 7 percent, more preferably at most about 5 percent and most preferably at most about 3 percent by volume of the article.

The reinforcing polymer may be any polymer so long as it has a surface comprised of a substantially random interpolymer (interpolymer) of at least one α-olefin with at least one vinyl or vinylidene aromatic monomer. Needless to say, the reinforcing polymer may be entirely comprised of an interpolymer, but it is preferred that the polymer is comprised of a core that is a polymer (core polymer) other than the interpolymer.

The interpolymer may cover any portion of the core polymer sufficient to impart one or more desirable properties, such as one of those previously described. Generally, at least about 1 percent of the surface area of the core polymer is comprised of the interpolymer polymer (also referred to as the surface polymer).

The interpolymer is prepared by polymerizing one or more α-olefins with one or more vinyl or vinylidene aromatic monomers and, optionally, other polymerizable monomers, as described by U.S. Pat. Nos. 6,156,842 and 6,190,768. Herein, the substantially random interpolymers also include pseudo-random interpolymers, as described in EP-A-0,416,815 by James C. Stevens, et al. and U.S. Pat. No. 5,703,187 by Francis J. Timmers, both of which are incorporated herein by reference in their entirety.

Suitable α-olefins include, for example, α-olefins containing from 2 to about 20, preferably from 2 to about 12, more preferably from 2 to about 8 carbon atoms. Particularly suitable are ethylene, propylene, butene-1,4-methyl-1-pentene, hexene-1 or octene-1 or ethylene in combination with one or more of propylene, butene-1,4-methyl-1-pentene, hexene-1 or octene-1. Preferably the α-olefin is propylene or ethylene. Most preferably the α-olefin is propylene. The α-olefins, as used herein, do not contain an aromatic moiety.

Other optional polymerizable ethylenically unsaturated monomer(s) include strained ring olefins, such as norbornene and $C_{1-10}$ alkyl or $C_{6-10}$ aryl substituted norbornenes, with an exemplary interpolymer being ethylene/styrene/norbornene.

Suitable vinyl or vinylidene aromatic monomers, which can be employed to prepare the interpolymers include, for example, those represented by the following formula:

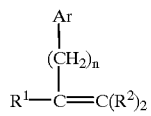

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 4, preferably from zero to 2, most preferably zero. Exemplary vinyl aromatic monomers include styrene, vinyl toluene, α-methylstyrene, t-butyl styrene, chlorostyrene, including all isomers of these compounds, and the like. Particularly suitable, such monomers include styrene and lower alkyl- or halogen-substituted derivatives thereof. Preferred monomers include styrene, α-methyl styrene, the lower alkyl-($C_1$-$C_4$) or phenyl-ring substituted derivatives of styrene, such as, for example, ortho-, meta-, and para-methylstyrene, the ring halogenated styrenes, para-vinyl toluene or mixtures thereof, and the like. A more preferred aromatic vinyl monomer is styrene.

The interpolymers may be modified by typical grafting, hydrogenation, functionalizing, or other reactions well-known to those skilled in the art. They may be readily sulfonated or chlorinated to provide functionalized derivatives according to established techniques.

The interpolymers may also be modified by various cross-linking processes including, but not limited to, peroxide-, silane-, sulfur-, radiation-, or azide-based cure systems. A full description of the various cross-linking technologies is described in U.S. Pat. Nos. 5,869,591 and 5,977,271, incorporated herein by reference.

The interpolymer may also be blended with any suitable component, such as another polymer or an additive as described on page 25, line 6 to page 43, line 25, of U.S. Pat. No. 6,156,842, previously incorporated herein by reference.

The interpolymers may be formed by any suitable process, such as those described by pages 20–24 of U.S. patent application Ser. No. 09/265,794, previously incorporated herein by reference. Generally, the substantially random interpolymers may be prepared by polymerizing a mixture of polymerizable monomers in the presence of one or more metallocene or constrained geometry catalysts in combination with various co-catalysts. Preferred operating conditions for such polymerization reactions are pressures from atmospheric up to 3000 atmospheres and temperatures from −30° C. to 200° C. Polymerizations and unreacted monomer removal at temperatures above the autopolymerization temperature of the respective monomers may result in formation of some amounts of homopolymer polymerization products resulting from free radical polymerization.

Exemplary methods include, but are not limited to, the following methods. One method of preparation of the substantially random interpolymers includes polymerizing a mixture of polymerizable monomers in the presence of one or more metallocene or constrained geometry catalysts in combination with various co-catalysts, as described in EP-A-0,416,815 by James C. Stevens, et al. and U.S. Pat. No. 5,703,187 by Francis J. Timmers, both of which are incorporated herein by reference in their entirety. Preferred operating conditions for such polymerization reactions are pressures from atmospheric up to 3000 atmospheres and temperatures from −30° C. to 200° C. Polymerizations and unreacted monomer removal at temperatures above the autopolymerization temperature of the respective monomers may result in formation of some amounts of homopolymer polymerization products resulting from free radical polymerization.

Examples of suitable catalysts and methods for preparing the substantially random interpolymers are disclosed in U.S. application Ser. No. 702,475 (C-39689), filed May 20, 1991 (EP-A-514,828); as well as U.S. Pat. Nos. 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187; and 5,721,185, all of which patents and applications are incorporated herein by reference.

The substantially random α-olefin/vinyl or vinylidene aromatic interpolymers can also be prepared by the methods described in JP 07/278230 employing compounds shown by the general formula:

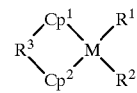

where $Cp^1$ and $Cp^2$ are cyclopentadienyl groups, indenyl groups, fluorenyl groups, or substituents of these, independently of each other; $R^1$ and $R^2$ are hydrogen atoms, halogen atoms, hydrocarbon groups with carbon numbers of 1–12, alkoxyl groups, or aryloxyl groups, independently of each other; M is a group IV metal, preferably Zr or Hf, most preferably Zr; and $R^3$ is an alkylene group or silanediyl group used to cross-link $Cp^1$ and $Cp^2$.

The substantially random α-olefin/vinyl or vinylidene aromatic interpolymers can also be prepared by the methods described by John G. Bradfute, et al. (W.R. Grace & Co.) in WO 95/32095; by R. B. Pannell (Exxon Chemical Patents, Inc.) in WO 94/00500; and in *Plastics Technology*, p. 25 (September 1992), all of which are incorporated herein by reference in their entirety.

Also suitable are the substantially random interpolymers which comprise at least one α-olefin/vinyl aromatic/vinyl aromatic/α-olefin tetrad disclosed in U.S. application Ser. No. 08/708,869 (C-42611), filed Sep. 4, 1996 and WO 98/09999, both by Francis J. Timmers, et al. These interpolymers contain additional signals in their carbon-13 NMR spectra with intensities greater than three times the peak to peak noise. These signals appear in the chemical shift range 43.70–44.25 ppm and 38.0–38.5 ppm. Specifically, major peaks are observed at 44.1, 43.9, and 38.2 ppm. A proton test NMR experiment indicates that the signals in the chemical shift region 43.70–44.25 ppm are methine carbons and the signals in the region 38.0–38.5 ppm are methylene carbons.

It is believed that these new signals are due to sequences involving two head-to-tail vinyl aromatic monomer insertions preceded and followed by at least one α-olefin insertion, e.g., an ethylene/styrene/styrene/ethylene tetrad, wherein the styrene monomer insertions of said tetrads occur exclusively in a 1,2 (head to tail) manner. It is understood by one skilled in the art that for such tetrads involving a vinyl aromatic monomer, other than styrene and an α-olefin, other than ethylene, that the ethylene/vinyl aromatic monomer/vinyl aromatic monomer/ethylene tetrad will give rise to similar carbon-13 NMR peaks but with slightly different chemical shifts.

These interpolymers can be prepared by conducting the polymerization at temperatures of from about −30° C. to about 250° C. in the presence of such catalysts as those represented by the formula

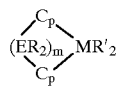

wherein: each Cp is independently, in each occurrence, a substituted cyclopentadienyl group π-bound to M; E is C or Si; M is a group IV metal, preferably Zr or Hf, most preferably Zr; each R is independently, in each occurrence, H, hydrocarbyl, silahydrocarbyl, or hydrocarbylsilyl, containing up to about 30, preferably from 1 to about 20, more preferably from 1 to about 10 carbon or silicon atoms; each R' is independently, in each occurrence, H, halo, hydrocarbyl, hyrocarbyloxy, silahydrocarbyl, hydrocarbylsilyl containing up to about 30, preferably from 1 to about 20, more preferably from 1 to about 10 carbon or silicon atoms, or two R' groups together can be a $C_{1-10}$ hydrocarbyl substituted 1,3-butadiene; m is 1 or 2; and, optionally, but preferably in the presence of an activating co-catalyst. Particularly, suitable substituted cyclopentadienyl groups include those illustrated by the formula:

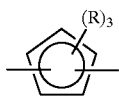

wherein each R is independently, in each occurrence, H, hydrocarbyl, silahydrocarbyl, or hydrocarbylsilyl, containing up to about 30, preferably from 1 to about 20, more preferably from 1 to about 10 carbon or silicon atoms, or two R groups together form a divalent derivative of such group. Preferably, R independently, in each occurrence, is (including where appropriate all isomers) hydrogen, methyl, ethyl, propyl, butyl, pentyl, hexyl, benzyl, phenyl or silyl or (where appropriate) two such R groups are linked together forming a fused ring system, such as indenyl, fluorenyl, tetrahydroindenyl, tetrahydrofluorenyl, or octahydrofluorenyl.

Particularly preferred catalysts include, for example, racemic-(dimethylsilanediyl)-bis-(2-methyl-4-phenylindenyl)zirconium dichloride, racemic-(dimethylsilanediyl)-bis-(2-methyl-4-phenylindenyl) zirconium 1,4-diphenyl-1,3-butadiene, racemic-(dimethylsilanediyl)-bis-(2-methyl-4-phenylindenyl) zirconium di-$C_{1-4}$ alkyl, racemic-(dimethylsilanediyl)-bis-(2-methyl-4-phenylindenyl)zirconium di-$C_{1-4}$ alkoxide, or any combination thereof and the like.

It is also possible to use the titanium-based constrained geometry catalysts, [N-(1,1-dimethylethyl)-1,1-dimethyl-1-[(1,2,3,4,5-η)-1,5,6,7-tetrahydro-s-indacen-1-yl] silanaminato(2-)-N]titanium dimethyl; (1-indenyl)(tert-butylamido)dimethyl-silane titanium dimethyl; ((3-tert-butyl)(1,2,3,4,5-η)-1-indenyl)(tert-butylamido) dimethylsilane titanium dimethyl; and ((3-iso-propyl)(1,2,3,4,5-η)-1-indenyl)(tert-butyl amido)dimethylsilane titanium dimethyl, or any combination thereof and the like.

Further preparative methods for the interpolymers used in the present invention have been described in the literature. Longo and Grassi (*Makromol. Chem.*, Volume 191, pages 2387 to 2396 [1990]) and D'Anniello, et al. (*Journal of Applied Polymer Science*, Volume 58, pages 1701–1706 [1995]) reported the use of a catalytic system based on methylalumoxane (MAO) and cyclopentadienyltitanium trichloride ($CpTiCl_3$) to prepare an ethylene-styrene copolymer. Xu and Lin (*Polymer Preprints*, Am. Chem. Soc., Div. Polym. Chem., Volume 35, pages 686–687 [1994]) have reported copolymerization using a $MgCl_2/TiCl_4/NdCl_3/Al(iBu)_3$ catalyst to give random copolymers of styrene and propylene. Lu, et al. (*Journal of Applied Polymer Science*, Volume 53, pages 1453–1460 [1994]) have described the copolymerization of ethylene and styrene using a $TiCl_4/NdCl_3/MgCl_2/Al(Et)_3$ catalyst. Sernetz and Mulhaupt, (*Macromol. Chem. Phys.*, Vol. 197, pp. 1071–1083, 1997) have described the influence of polymerization conditions on the copolymerization of styrene with ethylene using $Me_2Si(Me_4Cp)$ (N-tert-butyl)$TiCl_2$/methylaluminoxane Ziegler-Natta catalysts. Copolymers of ethylene and styrene produced by bridged metallocene catalysts have been described by Arai, Toshiaki and Suzuki (*Polymer Preprints*, Am. Chem. Soc., Div. Polym. Chem., Vol. 38, pages 349, 350 [1997]). The manufacture of α-olefin/vinyl aromatic monomer interpolymers, such as propylene/styrene and butene/styrene, are described in U.S. Pat. No. 5,244,996, issued to Mitsui Petrochemical Industries Ltd. or U.S. Pat. No. 5,652,315, also issued to Mitsui Petrochemical Industries Ltd., or as disclosed in DE 197 11 339 A1 to Denki KAGAKU Kogyo KK. All of the above methods disclosed for preparing the interpolymer component are incorporated herein by reference.

While preparing the substantially random interpolymer, an amount of atactic vinyl or vinylidene aromatic homopolymer may be formed due to homopolymerization of the vinyl or vinylidene aromatic monomer at elevated temperatures. The presence of vinyl or vinylidene aromatic homopolymer is, in general, not detrimental for the purposes of the present invention and can be tolerated. The vinyl or vinylidene aromatic homopolymer may be separated from the interpolymer, if desired, by extraction techniques, such as selective precipitation from solution with a non-solvent for either the interpolymer or the vinyl or vinylidene aromatic homopolymer. For the purpose of the present invention, it is preferred that no more than 20 weight percent, preferably less than 15 weight percent, based on the total weight of the interpolymers of atactic vinyl or vinylidene aromatic homopolymer, is present.

The polymers, which are not interpolymers, which may be employed in the practice of the present invention, for example, for preparing the cores of fibers, include polyolefins, thermoplastic hydroxy-functionalized polyether or polyester, polyesters, polyamides, polyethers, polysaccharides, modified polysaccharides or naturally-occurring fibers or particulate fillers; thermoplastic polyurethanes, thermoplastic elastomers and glycol-modified copolyester (PETG). Other polymers of the polyester or polyamide-type can also be employed in the practice of the present invention for preparing the fiber. Such polymers include polyhexamethylene adipamide, polycaprolactone, polyhexamethylene sebacamide, polyethylene 2,6-naphthalate and polyethylene 1,5-naphthalate, polytetramethylene 1,2-dioxybenzoate and copolymers of ethylene terephthalate and ethylene isophthalate.

The thermoplastic hydroxy-functionalized polyether or polyester may be any suitable kind, such as those known in the art. For example, they can be one of those described by U.S. Pat. Nos. 5,171,820; 5,275,853; 5,496,910; 5,149,768 and 3,305,528.

The polyesters and methods for their preparation are well-known in the art and reference is made thereto for the purposes of this invention. For purposes of illustration and not limitation, reference is particularly made to pages 1–62 of Volume 12 of the *Encyclopedia of Polymer Science and Engineering*, 1988 revision, John Wiley & Sons.

The polyamides, which can be employed in the practice of the present invention for preparing the fibers, include the various grades of nylon, such as nylon 6, nylon 6,6 and nylon 12.

By the term "polyolefin" is meant a polymer or copolymer, other than the interpolymers described above, derived from simple olefin monomers, such as ethylene, propylene, butylene, isoprene, and the like and one or more monomers copolymerizable therewith. Such polymers (including raw materials, their proportions, polymerization temperatures, catalysts and other conditions) are well-known in the art and reference is made thereto, for the purpose of this invention. Additional co-monomers, which can be polymerized with ethylene, include olefin monomers having from 3 to 12 carbon atoms, ethylenically unsaturated carboxylic acids (both mono- and difunctional) and derivatives of such acids, such as esters (for example, alkyl acrylates) and anhydrides. Exemplary monomers, which can be polymerized with ethylene, include 1-octene, acrylic acid, methacrylic acid, vinyl acetate and maleic anhydride.

The polyolefins, which can be employed in the practice of the present invention, for example, for preparing the core polymer, such as in fibers, include polypropylene, polyethylene, and copolymers and blends thereof, as well as ethylene-propylene-diene terpolymers. Preferred polyolefins are polypropylene, linear high density polyethylene (HDPE), heterogeneously-branched linear low density polyethylene (LLDPE), such as DOWLEX polyethylene resin (a trademark of The Dow Chemical Company), heterogeneously-branched ultra low linear density polyethylene (ULDPE), such as ATTANE ULDPE (a trademark of The Dow Chemical Company); homogeneously-branched, linear ethylene/α-olefin copolymers, such as TAFMER (a trademark of Mitsui Petrochemicals Company Limited) and EXACT (a trademark of Exxon Chemical Company); homogeneously branched, substantially linear ethylene/α-olefin polymers, such as AFFINITY (a trademark of The Dow Chemical Company) and ENGAGE (a trademark of DuPont Dow Elastomers L.L.C.) polyolefin elastomers, which can be prepared as disclosed in U.S. Pat. Nos. 5,272,236 and 5,278,272; and high pressure, free radical polymerized ethylene polymers and copolymers, such as low density polyethylene (LDPE), ethylene-acrylic acid (EAA) copolymers, such as PRIMACOR (a trademark of The Dow Chemical Company), and ethylene-vinyl acetate (EVA) copolymers, such as ESCORENE polymers (a trademark of Exxon Chemical Company), and ELVAX (a trademark of E.I. du Pont de Nemours & Co.). The more preferred polyolefins are the homogeneously-branched linear and substantially linear ethylene copolymers with a density (measured in accordance with ASTM D-792) of 0.85 to 0.99 g/cm$^3$, a weight average molecular weight to number average molecular weight ratio (Mw/Mn) from 1.5 to 3.0, a measured melt index (measured in accordance with ASTM D-1238 (190/2.16)) of 0.01 to 100 grams per 10 minutes, and an I10/I2 of 6 to 20 (measured in accordance with ASTM D-1238 (190/10)).

In general, high density polyethylene (HDPE) has a density of at least about 0.94 gram per cubic centimeter (gram per cc) (ASTM Test Method D-1505). HDPE is commonly produced using techniques similar to the preparation of linear low density polyethylenes. Such techniques are described in U.S. Pat. Nos. 2,825,721; 2,993,876; 3,250,825 and 4,204,050. The preferred HDPE employed in the practice of the present invention has a density of from 0.94 to 0.99 g/cc and a melt index of from 0.01 to 35 grams per 10 minutes, as determined by ASTM Test Method D1238.

The polysaccharides, which can be employed in the practice of the present invention, are the different starches, celluloses, hemicelluloses, xylanes, gums, pectins and pullulans. Polysaccharides are known and are described, for example, in *Encyclopedia of Polymer Science and Technology*, 2nd edition, 1987. The preferred polysaccharides are starch and cellulose.

The modified polysaccharides, which can be employed in the practice of the present invention, are the esters and ethers of polysaccharides, such as, for example, cellulose ethers and cellulose esters, or starch esters and starch ethers. Modified polysaccharides are known and are described, for example, in *Encyclopedia of Polymer Science and Technology*, 2nd edition, 1987.

The term "starch," as used herein, refers to carbohydrates of natural vegetable origin, composed mainly of amylose and/or amylopectin, and includes unmodified starches, starches which have been dewatered but not dried, physically modified starches, such as thermoplastic, gelatinized or cooked starches, starches with a modified acid value (pH), where acid has been added to lower the acid value of a starch to a range of from 3 to 6, gelatinized starches, ungelatinized starches, cross-linked starches and disrupted starches (starches which are not in particulate form). The starches can be in granular, particulate or powder form. They can be extracted from various plants, such as, for example, potatoes, rice, tapioca, corn, pea, and cereals, such as rye, oats, and wheat.

Celluloses are known and are described, for example, in *Encyclopedia of Polymer Science and Technology*, 2nd edition, 1987. Celluloses are natural carbohydrate high polymers (polysaccharides) consisting of anhydroglucose units joined by an oxygen linkage to form long molecular chains that are essentially linear. Cellulose can be hydrolyzed to form glucose. The degree of polymerization ranges from 1000 for wood pulp to 3500 for cotton fiber, giving a molecular weight of from 160,000 to 560,000. Cellulose can be extracted from vegetable tissues (wood, grass, and cotton). Celluloses can be used in the form of fibers.

Naturally-occurring fibers or particulate fillers that may be employed in the practice of the present invention are, for example, wood flour, wood pulp, wood fibers, cotton, flax, hemp, or ramie fibers, rice or wheat straw, chitin, chitosan, cellulose materials derived from agricultural products, nut shell flour, corn cob flour, and mixtures thereof.

In general, the reinforcing polymer of the invention, when it is a fiber, should contain at least 1 weight percent of the interpolymer (surface polymer). A bi-component fiber with an interpolymer surface layer and a core is a preferred solution; however, blending of different polymers and extruding this blend into fiber form is also an acceptable processing route. The sheath layer preferably consists of at least 50 percent interpolymer and a core material may be, for example, PP, PE, PET or nylon. It is preferable that grafted PP core is used. A sheath layer generally should cover at least 10 percent of the core surface. The ratio of sheath to core (measured from fiber cross-section) ranges from 1:99 to 50:50 and preferably from 5:95 to 20:80.

Surprisingly, the interpolymer increases the bonding between the concrete and, for example, a fiber having the interpolymer in contact with the concrete compared to unmodified polyethylene or polypropylene fibers in concrete. The particular mechanism is not understood at this time, but may be due to the Tg coupled with crystallinity or lack of crystallinity of the interpolymer. As an illustration, the Tg may range from −10° C. to about 40° C. Preferably, the Tg is at least about 15, more preferably at least about 23, and most preferably at least 27 to preferably at most about 35, more preferably at most about 33, and most preferably at most about 31° C.

Generally, a fiber of this invention has a bonding energy (e.g., $J/m^2$) that is 50 percent greater than a similar polypropylene fiber as given, for example, by a known adhesion test, such as a flex test, for determination of flex strength of polymers, according to ASTM D-790 after the concrete has been for about 7 days at 20° F. Preferably the bonding energy is about 75 percent, more preferably about 200 percent, even more preferably 400 percent and most preferably 600 percent greater than the bonding energy of a similar unmodified polypropylene fiber. Generally, unmodified polypropylene fibers have a bonding energy of about 2 $J/m^2$, as determined by the above method.

Another advantage of the present invention may be the ability to fuse multiple fibers into larger bundles of monofilament fibers at low temperature, further improving the structural properties of the concrete. This allows the size and geometry of the fiber to be almost infinitely varied to improve the properties of the concrete.

In general, when a fiber is used in the present invention, the fibers may be formed by a suitable technique, such as known methods, for example, melt spinning, wet spinning or conjugate spinning. The fibers may be extruded into any size or length desired. They may also be extruded into any shape desired, such as, for example, cylindrical, cross-shaped, trilobal or ribbon-like cross-section.

Bicomponent fibers are a preferred fiber for use in the present invention. These preferred fibers may have one of the following cross-section structures:

(1) Side-by-Side
(2) Sheath-Core
(3) Islands-in-the Sea and
(4) Citrus (Segmented Pie).

Side-by-Side

A method for producing side-by-side bicomponent fibers is described in U.S. Pat. No. 5,093,061, which is incorporated herein by reference. The method comprises (1) feeding two polymer streams through orifices separately and converging at substantially the same speed to merge side-by-side as a combined stream below the face of the spinneret; or (2) feeding two polymer streams separately through orifices, which converge at the surface of the spinneret, at substantially the same speed to merge side-by-side as a combined stream at the surface of the spinneret. In both cases, the velocity of each polymer stream, at the point of merge, is determined by its metering pump speed and the size of the orifice. The fiber cross-section has a straight interface between two components.

Side-by-side fibers are generally used to produce self-crimping fibers. All commercially available self-crimping fibers are produced by using a system based on the different shrinkage characteristics of each component.

Sheath-Core

Sheath-core bicomponent fibers are those fibers where one of the components (core) is fully surrounded by a second component (sheath). Adhesion is not always essential for fiber integrity.

The most common way to produce sheath-core fibers is a technique in which two polymer liquids (melts) are separately led to a position very close to the spinneret orifices and then extruded in sheath-core form. In the case of concentric fibers, the orifice supplying the "core" polymer is in the center of the spinning orifice outlet and flow conditions of core polymer fluid are strictly controlled to maintain the concentricity of both components when spinning. Modifications in spinneret orifices enable one to obtain different shapes of core or/and sheath within the fiber cross-section.

The sheath-core structure is employed when it is desirable for the surface to have the property of one of the polymers, such as luster, dyeability or stability, while the core may contribute to strength, reduced cost and the like. The sheath-core fibers are used as crimping fibers and as bonding fibers in the non-woven industry.

Methods for producing sheath—core bicomponent fibers are described in U.S. Pat. Nos. 3,315,021 and 3,316,336, both of which are incorporated herein by reference.

Islands-in the-Sea

Islands-in-the sea fibers are also called matrix-filament fibers, which include heterogeneous bicomponent fibers. A method for producing islands-in-the sea fibers is described in U.S. Pat. No. 4,445,833, incorporated herein by reference. The method comprises injecting streams of core polymer into sheath polymer streams through small tubes with one tube for each core stream. The combined sheath-core streams converge inside the spinneret hole and form one island-in-the sea conjugate stream.

Mixing the different polymer streams with a static mixer in the spinning process also makes island-in-the-sea bicomponent fibers. The static mixer divides and redivides the polymer stream to form a matrix stream with multiple cores. This method for producing island-in-the-sea fibers is described in U.S. Pat. No. 4,414,276, which is incorporated herein by reference.

The islands-in-the-sea structure is employed when it is desirable to increase the modulus of the fiber, reduce moisture regain, reduce dyeability, improve the texturing capability or give the fiber a unique lustrous appearance.

Citrus Type (Segmented Pie)

The citrus type bicomponent or segmented pie bicomponent fibers can be made by polymer distribution and/or spinneret modifications of the pack assemblies employed in the methods described above for producing the side-by-side, sheath-core or islands-in-the-sea fibers. For example, by introducing a first polymer stream and a second polymer stream alternately through eight radial channels toward the spinneret hole instead of two channels, the resultant fiber is an eight-segment citrus type fiber. If the spinneret orifice has the configuration of three or four slots on a circle (a common orifice configuration to produce hollow fibers), the fiber is a hollow citrus type fiber with eight segments. The hollow citrus type fiber can also be made by the use of special spinneret orifice configurations with a sheath-core spin pack as described in U.S. Pat. Nos. 4,246,219 and 4,357,290, both of which are incorporated herein by reference.

The concrete article may be made by mixing the reinforcing polymer, water and concrete in any suitable manner. Preferably the concrete dry components (e.g., cement, sand and gravel) are dry mixed first and then water is mixed to make a wet mixture. Subsequently, the reinforcing polymer is mixed with the wet mixture. This mixture is then cast, shotcreted or molded or dispensed by any suitable method, such as those known in the art.

To the mixture, other additives useful in the formation of concrete may be added, such as a polymeric emulsion of styrene-butadiene, epoxy, polyurethane, and ethylene-styrene and synthetic polymer emulsions of the polymers described herein.

EXAMPLES

Example 1: Concrete Article Reinforced with Fibers

A concrete mixture was prepared by blending 12.95 volume percent Portland cement (Holnan Type 1), 35.28 volume percent sand (C-109 type), 28.9 volume percent pea gravel, 21.38 volume percent tap water, 0.49 percent super-plastisizer (assuming 40 percent solids-WRDA-19 from W.R. Grace & Co.) and 1.0 volume percent polymer fibers. The ratio of cement to water was 0.52.

The polymer fibers were a bi-component fiber comprised of a core of polypropylene and a sheath comprised of ESI (ethylene styrene interpolymer). The polypropylene had a 12 melt flow rate polypropylene, such as INSPIRE H509-12G polypropylene, available from The Dow Chemical Company, Midland, Mich., and constituted about 70 percent by weight of the fiber.

The ESI was, by weight, the polymerization product of about 77 percent of styrene monomer and the balance ethylene monomer, commercially available under the trade name INDEX from The Dow Chemical Company, Midland, Mich. The ESI had a melt index of 1 gram per 10 minutes as measured using ASTM D-1238 and a glass transition temperature of about 27 to about 30° C.

The fiber was made at Hills Inc., W. Melbourne, Fla., using commercially available melt spinning equipment. All of the fibers made had a sheath/core trilobal shape and round shape. The conditions to fabricate the fibers were as follows: Extrusion temperatures, ° C.

|  | Sheath | Core |
| --- | --- | --- |
| Zone 1 | 108 | 215 |
| Zone 2 | 230 | 240 |
| Zone 3 | 278 | 256 |
| Zone 4 | 280 | 262 |
| Spin head temperature |  | 280 |
| Extruder Pressure | 1500 psi | 750 |
| Speed of denier roll, rpm |  | 150 |
| Speed of tension roll |  | 160 |
| Draw ratio |  | 8:1 |
| Temperature on denier roll |  | 100° C. |
| Quench temp.° F. |  | 65° F. |

The fibers consisted of round microfibers, which were fused into larger macro fibers (1400 denier). The macrofiber had a denier of about 1400 grams and tenacity of about 6.2 grams per denier.

The dry ingredients (e.g., cement, sand and gravel) were first added and then water was added to make a base mixture. The macrofibers (about 2 inches long) were then added to the base mixture. The total mixing time was about 5 minutes. The slump measured for this concrete mix was about 65 mm and air content was about 5.5 percent. The concrete mixture containing the fibers was placed into rectangular bar molds that were 4 inches by 4 inches by 14 inches and cured in a water bath at a constant temperature of 20° C. for 14 days. In addition, the concrete mixture containing the fibers was cured for 1 and 14 days under the same conditions in cylindrical molds (diameter of 3 inches and height of 6 inches).

The rectangular bars, after 14 days of curing, had an average first crack strength of 4.1 Mpa, as determined in a 4 point bend test. The toughness was 39 Nm determined in a 4 point bend test. The toughness was 39 Nm using Japanese Standard JSCE-SF4 (Method of Test for Flexural Strength and Flexural Toughness of Steel Fiber Reinforced Concrete). The compressive strength of the cylindrical bars after 1 and 14 days of curing was 16 MPa, and 36 MPa by ASTM C-39-83b (Compressive Strength of Cylindrical Concrete Specimens).

Comparative Example 1

Concrete bars without fibers were made in the same way as described in Example 1. The results for these bars were as follows. The average first crack bend strength after 14 days cure was 4.5 MPa. Average toughness was about 1 Nm. The compressive strength of the bars after 1 and 14 days of curing was 15 MPa and 42 MPa.

Comparative Example 2

Concrete bars were made in the same way as in Example 1, except that the fibers were commercially available crimped polypropylene fibermesh fibers S-152 HPP (Fibermesh Ind., Chattanooga, Tenn.). The fiber was about 2 inches in length, had an oval cross-section of about 0.5–0.7 $mm^2$ (about 1 mm in longest direction) and a tenacity of about 4.5 grams per denier. The average first crack bend strength after the 14-day cure was about 3.8 MPa. The toughness was about 17.6 Nm. The compressive strength of the bars after 1 and 14 days of curing was 15 MPa and 37 MPa.

Comparative Example 3

Concrete bars were made in the same way as in Example 1, except that the fibers were commercial polypropylene fibers referred to as Blue Fibers from W.R. Grace Corp (Boston, Mass.). The fiber was about 2 inches in length and had a 0.6 mm² cross-sectional area. The average first crack bend strength after the 14-day cure was about 4.2 MPa. The average toughness was about 29 MPa. The compressive strength after 1 and 14 days of curing was 12 MPa and 35 MPa.

The concrete Example and Comparative Examples show that the concrete of the present invention has far superior toughness while maintaining compressive strength compared to concrete alone or concrete with commercial polypropylene fibers.

What is claimed is:

1. A concrete article comprised of concrete having therein a reinforcing polymer that has a surface in contact with the concrete, said surface being comprised of a substantially random interpolymer of at least one α-olefin with at least one vinyl or vinylidene aromatic monomer.

2. The concrete article of claim 1 wherein the α-olefin has from 2 to about 20 carbon atoms.

3. The concrete of claim 2 wherein the α-olefin has from 2 to about 8 carbon atoms.

4. The concrete article of claim 2 wherein the α-olefin is selected from the group consisting of ethylene, propylene, butene-1, 4-methyl-1-pentene, hexene-1 or octene-1 or combinations thereof.

5. The concrete article of claim 4 wherein the α-olefin is propylene or ethylene.

6. The concrete article of claim 5 wherein the α-olefin is ethylene.

7. The concrete article of claim 1 wherein the vinyl or vinylidene aromatic monomer is one having the following formula:

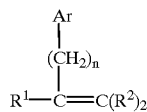

wherein $R^1$ is selected from the group of radicals consisting of hydrogen and alkyl radicals containing from 1 to about 4 carbon atoms, each $R^2$ is independently selected from the group of radicals consisting of hydrogen and alkyl radicals containing from 1 to about 4 carbon atoms, Ar is a phenyl group or a phenyl group substituted with from 1 to 5 substituents selected from the group consisting of halo, $C_{1-4}$-alkyl, and $C_{1-4}$-haloalkyl; and n has a value from zero to 4.

8. The concrete article of claim 7 wherein the vinyl or vinylidene aromatic monomer is selected from the group consisting of styrene, vinyl toluene, α-methylstyrene, t-butyl styrene, chlorostyrene, and isomers of these compounds.

9. The concrete article of claim 8 wherein the vinyl or vinylidene aromatic monomer is styrene.

10. The concrete article of claim 9 wherein the α-olefin is ethylene, propylene or combination thereof.

11. The concrete article of claim 10 wherein the α-olefin is ethylene.

12. The concrete article of claim 1 wherein the reinforcing polymer is a fiber comprising a blend of the interpolymer with a second polymer that is a hydroxy-functionalized polyether or polyester; polyolefin; polyester; polyamide; polysaccharide; modified polysaccharide or naturally-occurring fiber; thermoplastic polyurethane; thermoplastic elastomer; glycol-modified copolyester (PETG) or combinations thereof.

13. The concrete article of claim 12 wherein the second polymer is the polyolefin.

14. The concrete article of claim 13 wherein the second polymer is polyethylene, polypropylene, grafted polypropylene or grafted polyethylene.

15. The concrete article of claim 1 wherein the reinforcing polymer is a bicomponent fiber having (1) a first component comprising the interpolymer and (2) a second component comprising a hydroxy-functionalized polyether or polyester; polyolefin; polyester; polyamide; polysaccharide; modified polysaccharide or naturally-occurring fiber; thermoplastic polyurethane; thermoplastic elastomer; glycol-modified copolyester (PETG) or combinations thereof.

16. The concrete article of claim 15 wherein the fiber is a side-by-side bicomponent fiber, a sheath-core bicomponent fiber, a segmented-pie bicomponent fiber or an islands-in-the-sea bicomponent fiber.

17. The concrete article of claim 8 wherein the fiber is a sheath-core bicomponent fiber that has a sheath comprised of the first component and a core comprised of the second component.

18. The concrete article of claim 17 wherein the first component is an interpolymer of ethylene and styrene and the second component is polypropylene or grafted polypropylene.

19. The concrete article of claim 18 wherein the fiber has a cylindrical, cross-shaped, trilobal or ribbon-like cross-section.

20. The concrete article of claim 1 wherein the reinforcing polymer is in the form of a fiber, rod, sheet, tape, laminate or combinations thereof.

21. The concrete article of claim 1 wherein the reinforcing polymer is present in an amount of at least about 0.1 percent to at least about 10 percent by volume of the concrete article.

22. The concrete article of claim 21 wherein the reinforcing polymer is present in an amount of at least about 0.5 percent to at least about 5 percent by volume of the concrete article.

23. A method of preparing concrete comprised of mixing concrete, water and a reinforcing polymer comprised of a substantially random interpolymer of at least one α-olefin, with at least one vinyl or vinylidene aromatic monomer, and curing said concrete mixture to form the concrete article having the reinforcing polymer therein such that the reinforcing polymer has a surface comprised of the substantially random interpolymer in contact with the concrete.

24. A concrete article formed by the process of claim 23.

25. The process of claim 23 wherein the reinforcing polymer is a fiber.

* * * * *